(12) United States Patent
Mizuno et al.

(10) Patent No.: US 7,299,333 B2
(45) Date of Patent: Nov. 20, 2007

(54) COMPUTER SYSTEM WITH STORAGE SYSTEM HAVING RE-CONFIGURABLE LOGICAL VOLUMES

(75) Inventors: Yoichi Mizuno, Tokyo (JP); Naoto Matsunami, Tokyo (JP); Kenji Muraoka, Tokyo (JP); Yasuyuki Mimatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 11/078,023

(22) Filed: Mar. 11, 2005

(65) Prior Publication Data

US 2005/0154830 A1   Jul. 14, 2005

Related U.S. Application Data

(63) Continuation of application No. 09/910,153, filed on Jul. 20, 2001, now Pat. No. 6,880,058.

(30) Foreign Application Priority Data

Dec. 7, 2000   (JP) ............................. 2000-372578

(51) Int. Cl.
G06F 12/00   (2006.01)
(52) U.S. Cl. ..................... 711/170; 711/112; 711/114; 711/162
(58) Field of Classification Search ................... None
See application file for complete search history.

(56) References Cited

U.S. PATENT DOCUMENTS 5,794,255 A    8/1998   Hayashi et al.

5,875,456 A *  2/1999   Stallmo et al. ............. 711/114
6,052,759 A    4/2000   Stallmo et al.
6,289,398 B1   9/2001   Stallmo et al.

FOREIGN PATENT DOCUMENTS

| JP | 05-020155 A | 1/1993 |
|---|---|---|
| JP | 07-141231 A | 6/1995 |
| JP | 07-334398 A | 12/1995 |
| JP | 11-095934 A | 4/1999 |
| JP | 2000-242434 A | 9/2000 |

* cited by examiner

*Primary Examiner*—Kevin L. Ellis
*Assistant Examiner*—Mardochee Chery
(74) *Attorney, Agent, or Firm*—Townsend and Townsend and Crew LLP

(57) ABSTRACT

In order to enable an area of each logical volume to be expanded while continuously using the logical volume and to integrate separate logical volumes in a single continuous area, a storage has logical volume control means for controlling the construction of a logical volume, a logical volume number map in which logical volume construction information is described, and copy means for copying the logical volume. By allowing two or more inner logical numbers to be described per external logical number in the logical volume number map, improved flexibility in combining the logical volumes in the storage is achieved. By copying a plurality of separate logical volumes into a physical continuous area by the copy means, the logical volumes are integrated.

4 Claims, 14 Drawing Sheets

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 1-1 | 0 | 0 | 1048576 | WWNa | S_IDa | EXCLUSIVE |
| 0 | 0 | 0 | 1-1 | 1 | 0 | 1310720 | WWNb | S_IDb | EXCLUSIVE |
| ……… | ……… | ……… | ……… | ……… | ……… | ……… | ……… | ……… | ……… |
| 0 | 0 | 0 | 1-1 | n-1 | 0 | 917504 | WWNn | S_IDn | EXCLUSIVE |
| 0 | 0 | 1 | 1-1 | k | 0 | 2359296 | WWNa | S_IDa | COMMOMN |
| 0 | 0 | 1 | 1-1 | k | 0 | 2359296 | WWNb | S_IDb | COMMOMN |
| ……… | ……… | ……… | ……… | ……… | ……… | ……… | ……… | ……… | ……… |
| 0 | 0 | 1 | 1-1 | k | 0 | 2359296 | WWNn | S_IDn | COMMOMN |

FIG. 5

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 1-1 | 0 | 0 | 80000 | WWNa | S_IDa | EXCLUSIVE |
| 0 | 0 | 0 | 1-1 | 1 | 0 | 90000 | WWNb | S_IDb | EXCLUSIVE |
| — | — | — | — | 2 | — | 70000 | — | — | — |
| ...... | ...... | ...... | ...... | ...... | ...... | ...... | ...... | ...... | ...... |

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 2-1 | 0 | 0 | 80000 | WWNa | S_IDa | EXCLUSIVE |
| 0 | 0 | 0 | 1-1 | 1 | 0 | 90000 | WWNb | S_IDb | EXCLUSIVE |
|  |  |  | 2-2 | 2 | 80000 | 70000 | — | — | — |
| — | — | — | ..... | ..... | ..... | ..... | ..... | ..... | ..... |

FIG. 6B

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 3-1 | 0 | 0 | 80000 | WWNa | S_IDa | EXCLUSIVE |
| 0 | 0 | 0 | 1-1 | 1 | 0 | 90000 | WWNb | S_IDb | EXCLUSIVE |
|  |  |  | 3-2 | 2 | 80000 | 70000 | WWNa | S_IDa | EXCLUSIVE |
| — | — | — | 3-3 | 5 | 150000 | 100000 | WWNa | S_IDa | EXCLUSIVE |
| ..... | ..... | ..... | ..... | ..... | ..... | ..... | ..... | ..... | ..... |

FIG. 6C

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 3-1 | 0 | 0 | 80000 | WWNa | S_IDa | EXCLUSIVE |
| 0 | 0 | 0 | 1-1 | 1 | 0 | 90000 | WWNb | S_IDb | EXCLUSIVE |
|  |  |  | 3-2 | 5 | 80000 | 100000 | WWNa | S_IDa | EXCLUSIVE |
| — | — | — | 3-3 | 2 | 180000 | 70000 | WWNa | S_IDa | EXCLUSIVE |
| ..... | ..... | ..... | ..... | ..... | ..... | ..... | ..... | ..... | ..... |

FIG. 11

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| 0 | 0 | 0 | 1-1 | 0 | 0 | 80000 | WWNa | S_IDa | EXCLUSIVE |
| 0 | 0 | 0 | 1-1 | 1 | 0 | 90000 | WWNb | S_IDb | EXCLUSIVE |
| — | — | — | — | — | — | — | — | — | — |
| ......... | ......... | ......... | ......... | ......... | ......... | ......... | ......... | ......... | ......... |

| PORT NUMBER | TARGET ID | OUTER LUN | LUN COMBING INFORMATION | INNER LUN | TOP LBA | THE NUMBER OF BLOCK | WWN | S_ID | PROPERTY |
|---|---|---|---|---|---|---|---|---|---|
| — | — | — | — | 0 | — | 80000 | — | — | — |
| 0 | 0 | 0 | 1-1 | 1 | 0 | 90000 | WWNb | S_IDb | EXCLUSIVE |
| 0 | 0 | 0 | 1-1 | 2 | 0 | 180000 | WWNa | S_IDa | EXCLUSIVE |
| ......... | ......... | ......... | ......... | ......... | ......... | ......... | ......... | ......... | ......... |

111

COMPUTER SYSTEM WITH STORAGE SYSTEM HAVING RE-CONFIGURABLE LOGICAL VOLUMES

BACKGROUND OF THE INVENTION

The present invention relates to a method of changing the construction of a logical volume area in a storage and, more particularly, a method of expanding a logical volume area.

Conventionally, as a method of expanding the capacity in a storage, an expansion method by adding a physical disk is known. The method will be described with reference to FIG. 15. Reference numeral 100 denotes a storage and 101 indicates a physical disk area as a collection of physical disks. In the physical disk area 101, logical volumes called LU (Logical Units) designated by reference numerals 1011x (1011a, 1011b, . . . ) are constructed. In the case of expanding the capacity of the storage, by adding a physical disk to the storage 100, as shown by a broken line, an added disk area 102 is generated. When the logical volumes LU1 (1011a) and LU2 (1011b) in the physical disk area 101 become full, a new logical volume LU3 (1011c) can be generated in the added disk area 102.

However, in the case of expanding the area of an internal logical volume already allocated to increase the usable capacity of the storage, a problem occurs. For example, in the case of enlarging the LU1 (1011a) in FIG. 15, since the LU2 (1011b) immediately follows, the LU2 (1011b) has to be released. In order to enlarge the logical volume area in the storage 100, the area has to be released once and allocation of the logical volume area has to be newly defined. Consequently, an access to a logical volume has to be interrupted.

SUMMARY OF THE INVENTION

As described above, it is easy to increase the capacity of a logical volume area by adding a physical disk even during operation of the system. On the other hand, since the logical volumes are constructed in an inner continuous area, the area of each logical volume cannot be expanded during operation of the system without newly adding a physical disk. In other words, to enlarge a logical volume area in a storage, the area has to be released once and a logical volume area has to be newly defined. A logical volume area cannot be therefore changed during operation of the system.

It is an object of the invention to enable the construction of a logical volume to be freely changed during operation of the system, for example, to expand a logical volume area in a storage. Specifically, an object of the invention is to provide a method of enabling the logical volume area to be expanded without releasing an existing logical volume area and expanding the logical volume area without interrupting an access to an existing logical volume.

A computer system to which the invention is applied, thereby obtaining effects has, for example, at least one computer, a storage, and a control utility for instructing a construction change in a logical volume in the storage.

According to the invention, the storage has logical volume control means for controlling the construction of the logical volume, and the logical volume control means is provided with a logical volume number map in which logical volume construction information is described. By describing the constructions of the computer and logical volumes and the combination with logical volumes in the storage which can be used by the computer, a construction change in the logical volumes can be freely made. By copying a plurality of separate logical volumes into a physically continuous area so as to be integrated to a single logical volume, management of the logical volume is facilitated.

BRIEF DESCRIPTION OF THE DRAWINGS

FIG. 2 is a diagram showing an example of an LUN map of a storage 1 in the first embodiment of the invention.

FIG. 5 is a diagram showing an example of an LUN map before an inner LU is changed in the first embodiment of the invention.

FIGS. 6A to 6C are diagrams showing examples of the LUN map after changing the inner LUs in the first embodiment of the invention.

FIG. 11 is a diagram showing an example of an LUN map before an internal LU in the second embodiment of the invention is changed.

FIG. 12 is a diagram showing an example of an LUN map after the internal LUs of the second embodiment of the invention are changed.

DESCRIPTION OF THE PREFERRED EMBODIMENTS

Figure 1:
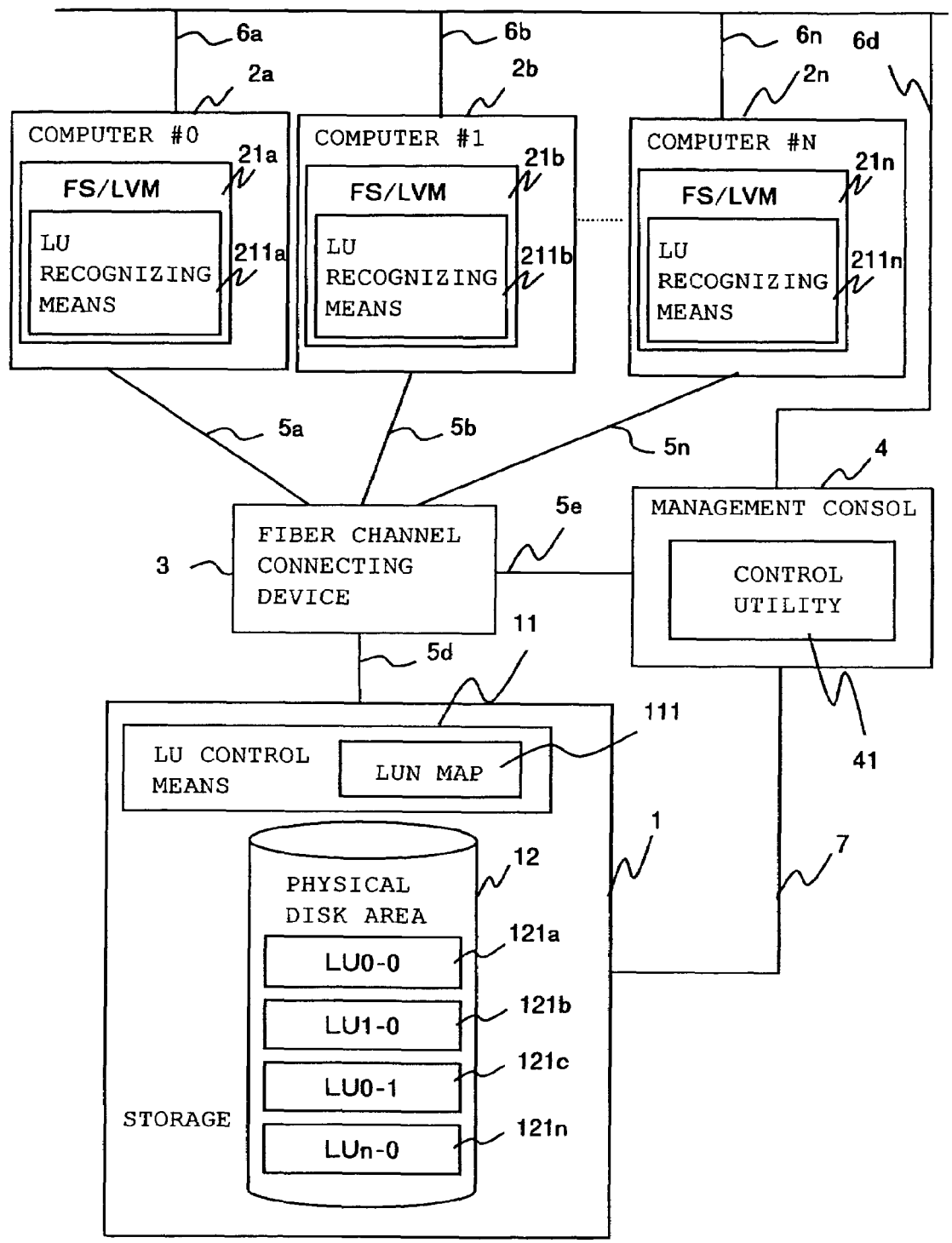
FIG. 1 is a diagram showing the configuration of a computer system according to a first embodiment of the invention.

The invention will be described hereinbelow by referring to the drawings showing embodiments.

Embodiment I

FIG. 1 is a diagram showing the configuration of a computer system according to a first embodiment. Shown in the diagram are computers 2x (2a, 2b, . . . , 2n), a storage 1 shared by all the computers 2x, a management console 4 for managing the computer system, a fiber channel connecting device 3 for connecting all the computers 2x, storage 1, and management console 4 with each other, fiber channels 5x (5a, 5b, . . . , 5n), a LAN (Local Area Network) 6x (6a, 6b, . . . , 6n) used for communications between the plurality of computers 2x and the management console 4, and communication means 7 used for communications between the storage 1 and the management console 4.

Each of the computers 2x has therein logical volume management software 21x (21a, 21b, ..., 21n) called a file system FS or generally LVM, and a logical unit recognizing means 211x (211a, 211b, ..., 211n) for recognizing a logical volume construction or the like of the storage 1 and notifying the logical volume management software 21x of a change in the construction. The logical volume is a virtual volume provided in the storage 1 and is a name defined in the specification of an SCSI (Small Computer System Interface) as one of protocols of an interface connecting the computer 2x and the storage 1. In the following, the logical volume may be also simply called an LU (Logical Unit). A number for identifying an LU will be called a logical unit number (LUN).

The management console 4 has a control utility 41 used to display the LU construction in the storage 1, set an LU in the storage 1 by the manager of the system, and so on. The control utility 41 is disposed on the management console 4 in this case but may be disposed in the computer 2x or storage 1.

The storage 1 has therein a logical volume control means 11 for controlling the construction of a logical volume in the storage 1 and notifying of logical volume construction information in response to a request from the logical volume recognizing means 211x in each computer 2x. Reference numeral 111 denotes a logical volume number map (LUN map) and is, as a component of the LU control means 11, a map showing logical correspondence between the logical volume in the storage 1 and the logical volume recognized by the computer 2x. Reference numeral 12 denotes a physical disk area which is a collection of physical disks. In the physical disk area 12, logical volumes 121x (121a, 121b, ..., 121n) logically generated are provided.

The logical volume LU will be described. The LU is a logical volume seen from a computer 2x (2a, 2b, ..., 2n) of the storage 1. The computer recognizes an LU as a logical disk drive. The storage 1 defines and internally constructs a plurality of LUs which will be called internal logical volumes (internal LUs). In the storage 1, in order to control the internal LUs, integers starting from zero are serially given to the internal LUs. The numbers will be called internal logical volume numbers (internal LUNs).

Generally, a computer searches a storage connected for an LU at the time of booting the OS. There are the following two constraints to searching methods, which are techniques of shortening a search time.

(a) To search the logical volume numbers LUN sequentially from 0.

(b) To stop searching when a certain number does not exist on assumption that the logical volume numbers LUN exist as serial numbers.

It is also assumed that the computer of the invention has such characteristics. In such a case, when the internal logical volume number LUN is assigned as it is to a computer, a computer to which a number other than zero is assigned cannot detect the LU. Specifically, in each of all the computers, it is assumed that the logical volume numbers LUN used by the computer start from zero. When the inner logical volume numbers are directly assigned as the logical volume numbers LUN, consequently, for the computers to which numbers other than zero are assigned as the internal LUNs, it is equivalent that no logical volume LU is assigned. Therefore, the inner logical volume numbers LUN starting from zero seen from the computer and which are serial numbers have to be assigned to each of all the computers.

In the invention, the storage 1 re-defines the internal LUs used by a computer 2x so that serial logical volume numbers starting from 0 when seen from the computer 2x are assigned to the internal LUs used by the computer 2x, thereby solving the problem. An LU recognized by each computer 2x will be called an outer logical volume (outer LU) and the number assigned to the outer LU will be called an outer logical volume number (outer LUN), so as to be distinguished from the inner LU and inner LUN, respectively. According to the invention, LUN combining information to define the relation between an outer LU and an inner LU is provided between the outer and inner LUs. By using the LUN combining information, the construction of combination between the outer and inner LUs can be changed. The corresponding relations among the outer LUN, LUN combining information, and inner LUN are managed by the LUN map 111 in the storage 1.

FIG. 2 shows an example of the LUN map 111 of the storage 1. In the LUN map 111, port number, target ID, outer LUN, LUN combining information, inner LUN, WWN, S_ID, and property are stored. The items will be described hereinbelow.

In the "port number", the number of a fiber channel connection port of the storage 1 is stored. In the embodiment, the number of port is assumed to be one, and "0" is stored.

The "target ID" is an identification of the storage 1 in the connection interface between the computer 2x and the storage 1. As in the embodiment, when the connection interface between the computer 2x and the storage 1 is a fiber channel, the only one D_ID (Destination ID) is assigned to each port. Since there is the item of the port number, the target ID may be omitted or D_ID determined at the time of initializing a fiber channel connection port may be stored. In the case of the SCSI, the same port can have a plurality of IDs, so that the target ID to which each LUN belongs is stored. In the embodiment, it is assumed that the fiber channel is used, so that the column of the target ID is not used and zero is stored.

The outer LUN, LUN combining information, and inner LUN show corresponding relations of each LUN. First, areas of physical disks in the storage 1 are the logical volume areas having inner LUNs 0 to n−1 and the logical volume areas having the inner LUN k. To each of the former areas, "0" is assigned as the outer LUN. To each of the latter areas, "1" is assigned as the outer LUN. The LUN combining information is information indicative of combining relation between the outer and inner LUNs. The left side of the LUN combining information indicates the total number of inner LUs assigned to the outer LU and the right side of the LUN combining information indicates the order of the inner LUs. Both of the numbers are connected via a hyphen.

The "top LBA" indicates an address in the outer LU to which the top address in each inner LU is assigned when it is seen from the computer 2x. LBA (Logical Block Address) denotes an address in an LU, and the computer 2x accesses data in the LU by using the address. When an outer LU is constructed by a single inner LU, "0" is assigned to the top LBA. In the case where an outer LU is constructed by a plurality of inner LUs due to a change in the construction of the LU, the top LBA is rewritten. This point will be concretely described when an example of the construction change of an LU will be described later.

"The number of blocks" indicates the number of logical blocks in each inner LU, and the size of each inner LU can be known by the number of blocks.

In the "WWN", world wide name as information to specify each computer 2x is stored. In a port-login process to establish a connection between a connection port of a fiber channel and a port, the WWN of each computer 2x is notified to the storage 1.

"S_ID" denotes ID information stored in a frame header of a fiber channel and is an ID of a source (initiator) which generates a frame. S_ID is dynamically assigned at the time of initializing a fiber channel. The above-mentioned WWN is a value unconditionally set according to the connection port of each fiber channel exchanged at the time of initialization. When WWN and S_ID are associated with each other, without checking the WWN each frame, only by checking S_ID, the computer 2x can be specified.

The "property" indicates the property of each LU. "Exclusive" denotes an LU exclusively used by a single computer 2x. "Common" indicates an LU shared by a plurality of computers 2x.

It is understood from the LUN map 111 shown in FIG. 2 that the inner LUs having the LUNs 0 to n−1 are exclusively assigned to the computers 2a to 2n, respectively. Although the inner LUNs are serial numbers, all the outer LUNs are "0". It is further known that an area having the inner LUN k is set for the common LUs. To the inner LU, the outer LUN of 1 is set. In the case of searching a storage at the time of booting the OS, by searching for 0 of the outer LUN and then 1, each computer can know inner LUs which can be used by itself.

Figure 3:
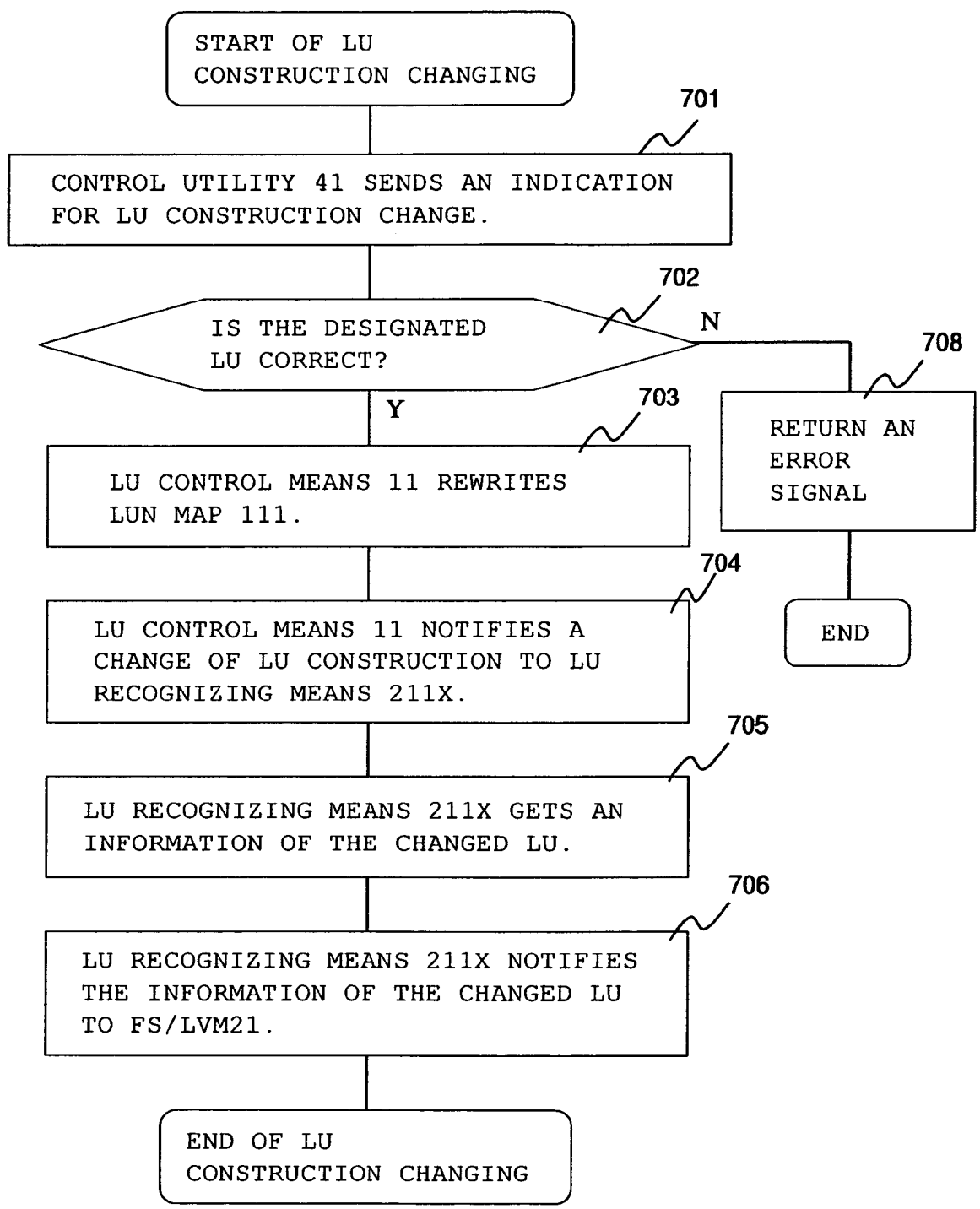
FIG. 3 shows a flowchart of a construction change in a logical volume LU in the first embodiment of the invention.

A construction change in the logical volume LU will now be described by referring to the flowchart of FIG. 3.

The operator of the management console 4 sends an indication for LU construction change from the control utility 41. In the case of expanding an LU, the inner LUN of the LU to be expanded and an inner LUN of an LU newly coupled are designated. The indication is sent via the communication means 7 to the storage 1 (step 701).

The LU control means 11 in the storage 1 receives the indication and determines whether the designated LU is correct or not (step 702). When the designated inner LU is not correct such that a not-existing LUN is designated, the inner LU to be newly combined has already assigned to another computer 2x; or the like, the LU control means 11 returns an error signal to the control utility 41 and the routine is finished (step 708). When the designated LU is correct, the LU control means 11 rewrites the LUN map 111 in accordance with the indication (step 703).

The LU construction change is notified to the LU-recognizing means 211x in the computer 2x by arbitrary one of the following methods; a method of transmitting the message from the LU control means 11 to the LU recognizing means 211x via the fiber channel 5x, a method of notifying the control utility 41 of the message by the LU control means 11 in the storage 1 and notifying the message from the control utility 41 to the LU recognizing means 211x in the computer 2x via the LAN 6x, and a method of operating the computer 2x directly by the manager to notify the LU recognizing means 211x of the message (step 704).

The LU recognizing means 211x gets the changed LU size from the LU control means 11. The LU recognizing means 211x may request the LU control means 11 to present the construction information without receiving the notification of the construction change. In this case, the notification of the construction change (step 704) can be omitted (step 705).

The LU recognizing means 211x notifies the information of the changed LUN and the size to the logical volume management software 21x (FS or LVM) and the changed LU is enabled to be used on the computer 2x (step 706).

As described above, while continuing an on-line access to an existing LU, the construction change can be made reflected.

Figure 4:
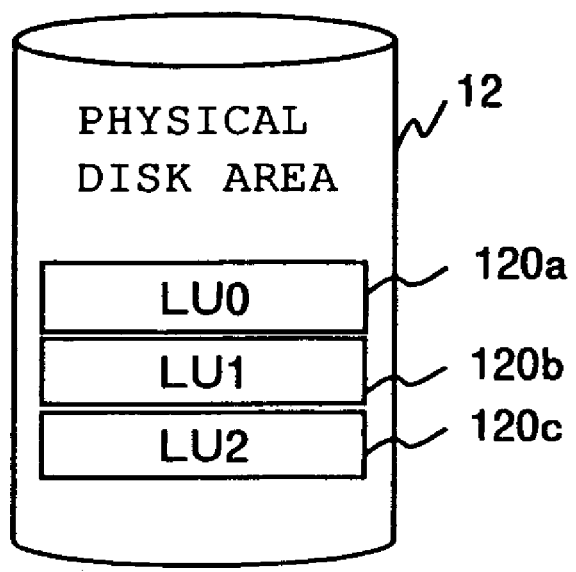
FIG. 4 is a diagram showing a state of the inner LUs in the physical disk area in the first embodiment of the invention.

An example of the LU construction change will now be concretely presented and rewriting of the LUN map 111 will be described in detail. As an example of the LU construction change, a case of expanding the LU0 area in the computer 2a will be taken. FIG. 4 shows a state of the inner LUs in the physical disk area 12. 120x (120a to 120c) denote inner LUs. In the physical disk area 12, an LU0 area 120a, an LU1 area 120b, and an LU2 area 120c are continuously constructed. To simplify the explanation, it is now assumed that the LU0 area 120a is assigned to the computer 2a, the LU1 area 120b is assigned to the computer 2b, and the LU2 area 120c is of an inner LU which is not assigned to any computer. In the example, although the LU area 120c is of the inner LU which is not assigned to any computer, since the LU1 area 120b is formed continuously after the LU0 area 120a, the LU0 area 120a cannot be expanded physically. In this state, the computer 2a sees the LU0 area 120a as its logical volume, and the computer 2b sees the LU1 area 120b as its logical volume.

FIG. 5 shows the LUN map 111 at this time. The inner LUN0 area is assigned to the computer 2a (WWNa), the inner LUN1 area is assigned to the computer 2b (WWNb), and the inner LUN2 area is blank (and the items are not defined). When a request of expanding the LU of the computer 2a is received, as described by referring to FIG. 3, the LU control means 11 rewrites the LUN map 111 so that the inner LU2 120c becomes the inner LU of the computer 2a on the basis of the instruction of the construction change sent from the control utility 41. FIG. 6A shows the LUN map 111 rewritten in such a manner. As understood from the above, the computer 2a can recognize LUs having the inner LUNs 0 and 2 as the LUs which can be used by itself. Since the inner LUN2 is used continuously after the inner LUN0, it is assumed that a process starts from the number of blocks of the top LBA of the inner LUN 2. The process is performed by the LU control means 11. In association with the process, WWN, S_ID, and the like corresponding to those of the computer 2a are stored. In the case of accessing the LU from the computer 2a, either the inner LU0 or LU2 to be accessed can be known from the top LBA.

Figure 7:
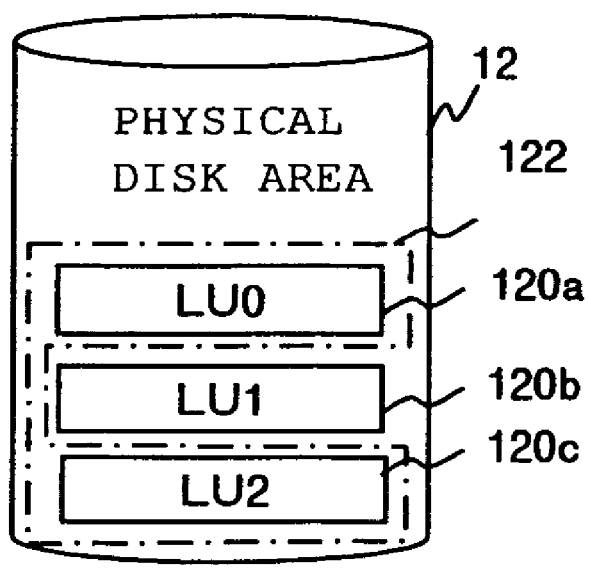
FIG. 7 is a diagram showing a state of the inner LUs in the physical disk area of FIG. 6A.

FIG. 7 is a diagram for explaining the state of the inner LUs in the physical disk area 12 rewritten as described above. As obviously understood in contrast to FIG. 4, although the inner LU120x (120a to 120c) are formed continuously in a manner similar to the above, an area 122 indicated by an alternate long and short dash line functions as an LU of the computer 2a. In this state, the computer 2a sees the total area 122 of the LU0 area 120a and the LU2 area 120c as a logical volume which can be used by itself. The computer 2b sees the LU1 area 120b as its logical volume.

FIGS. 6B and 6C show LUN maps 111 of other examples of the changed LU construction. FIG. 6B shows a state where, in addition to the logical volume obtained by adding the inner LU2 to the inner LU0 for the computer 2a, the inner LU5 is further added. FIG. 6C shows a state where, in addition to the logical volume obtained by adding the inner LU5 to the inner LU0 of the computer 2a, the inner LU2 is further added. That is, FIGS. 6B and 6C show examples which are different from each other with respect to the order of adding the inner LUNs. The difference in the orders does not mean anything for the computer 2a. As long as the LU control means 11 properly stores the top LBA and information such as WWN, S_ID, and the like associated with the construction change, in any of FIGS. 6B and 6C, the construction of the logical volume having the block numbers of the total three inner LUs can be used to execute the function of the LU control means 11.

By virtually managing the LU areas as described above, the construction change such as expansion of an LU which cannot be physically made out can be realized.

According to the embodiment, an effect of freely changing the construction of the logical volume areas in the storage is produced. According to the embodiment, another effect such that the logical volume area can be expanded while continuing an access to an existing logical volume is produced. Further, according to the embodiment, the construction can be changed in the storage, an effect such that the logical volume area can be expanded independent of the OS of the computer is produced.

Embodiment II

Figure 8:
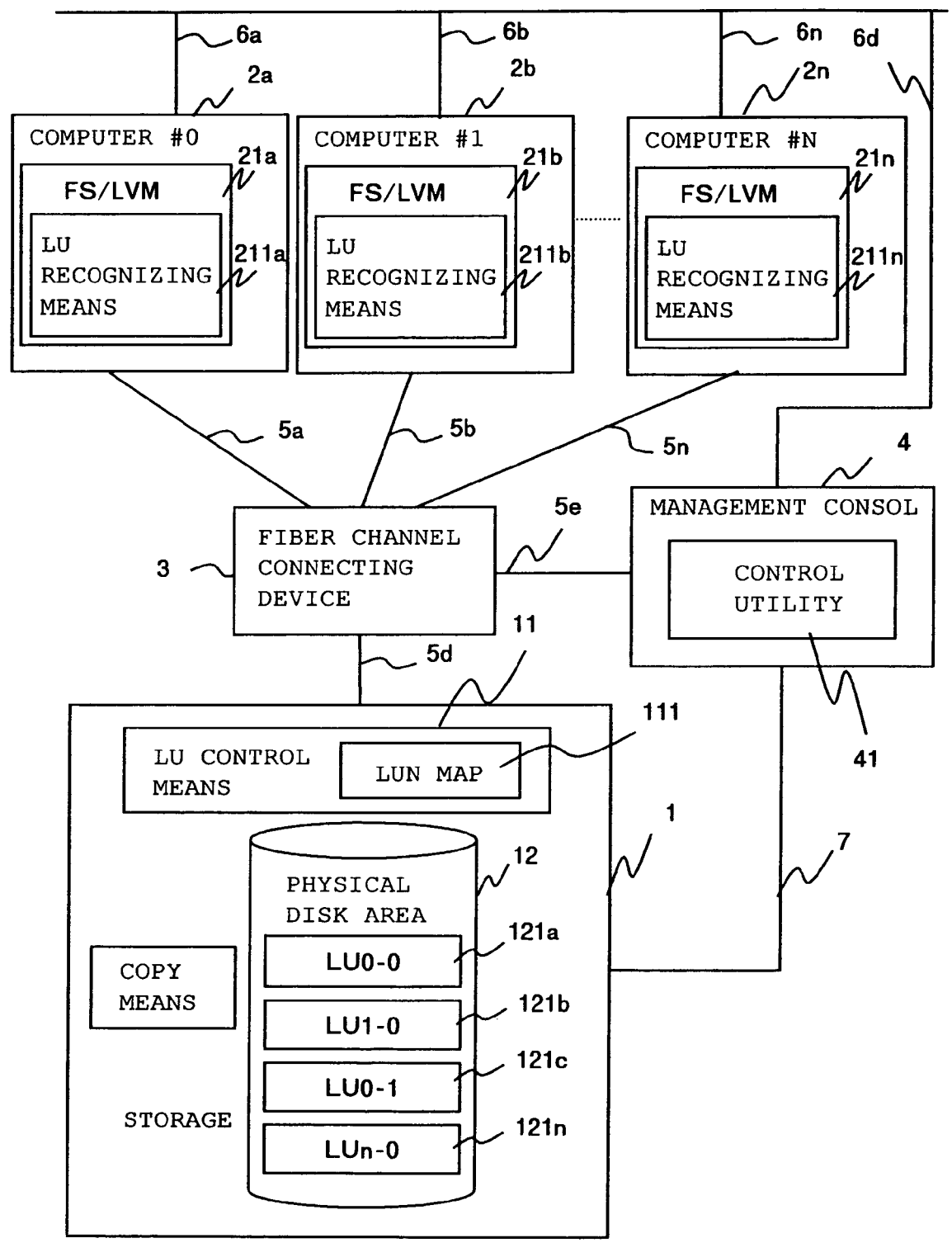
FIG. 8 is a diagram showing the configuration of a computer system according to a second embodiment of the invention.

FIG. 8 is a diagram showing the configuration of a computer system according to a second embodiment. The construction of the computer system is the same as that of the first embodiment except for the point that a copy means 13 is added to the storage 1. The copy means 13 is a means for copying an LU to another area.

Figure 9:
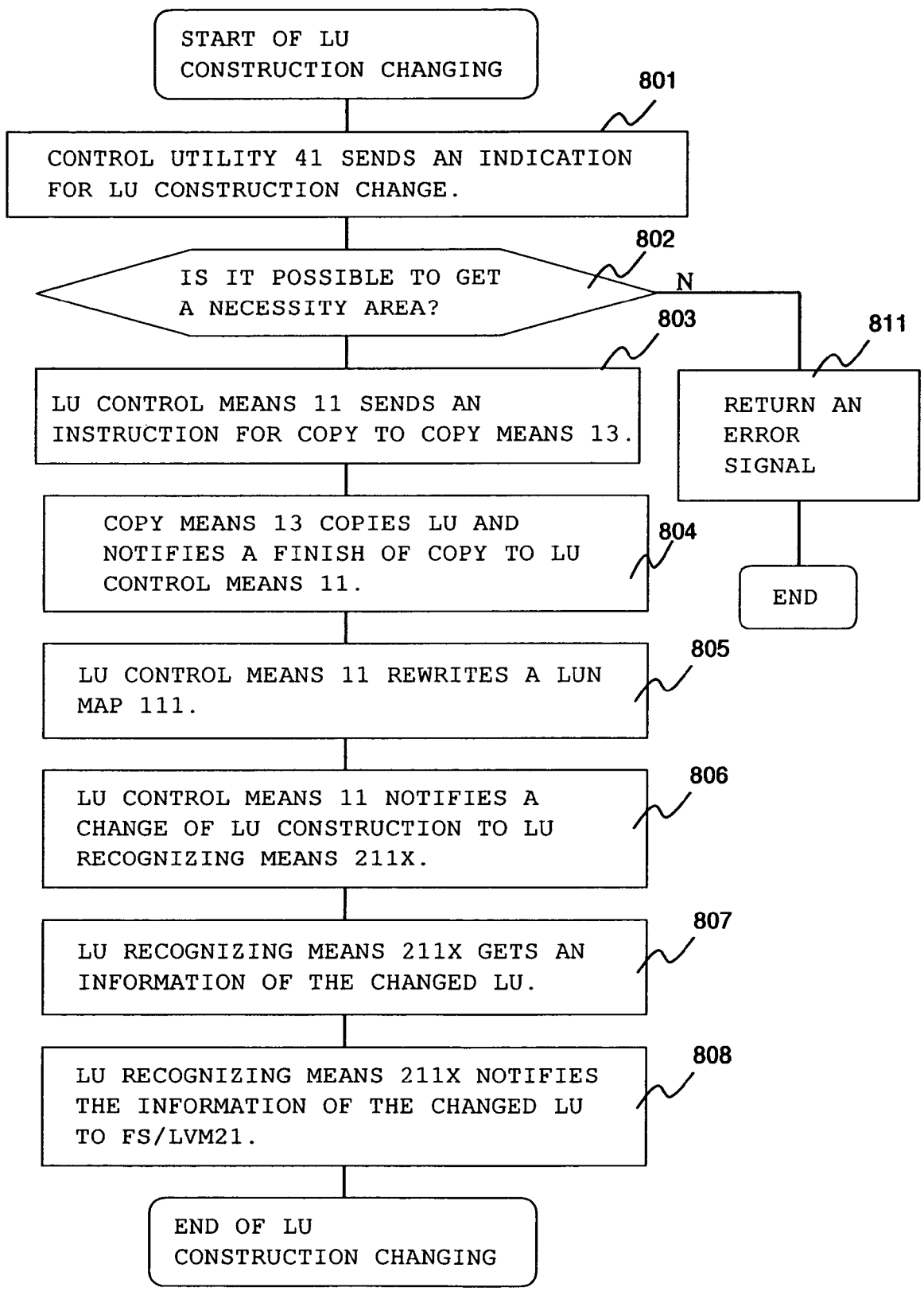
FIG. 9 shows a flowchart of a construction change in a logical volume LU in the second embodiment of the invention.

An LU construction change will be described by using the flowchart of FIG. 9. The operator of the management console 4 sends an indication for LU construction change from the control utility 41. In the case of expanding an LU, the inner LUN of the LU to be expanded and an expansion size are designated. This indication is sent to the storage 1 via the communication means 7 (step 801).

The LU control means 11 in the storage 1 receives the indication and determines whether the total size of the size of the designated inner LU and the expansion size can be assured from the free area or not (step 802).

When the area cannot be assured, the LU control means 11 sends an error signal to the control utility 41, and the routine is finished (step 809).

When the area can be assured, the LU control means 11 assures the area and sends a copy instruction for copy to the copy means 13 (step 803). The copy means 13 which has received the copy instruction copies the designated LU. After finishing the copying of the LU, the copy means 13 notifies a finish of copy to the LU control means 11 (step 804).

When the notification of copy end is received, the LU control means 11 rewrites the LUN map 111 and assigns a newly generated LU to the computer 2x (step 805).

The processes in step 806 and subsequent steps are similar to those in the first embodiment.

Figure 10A:
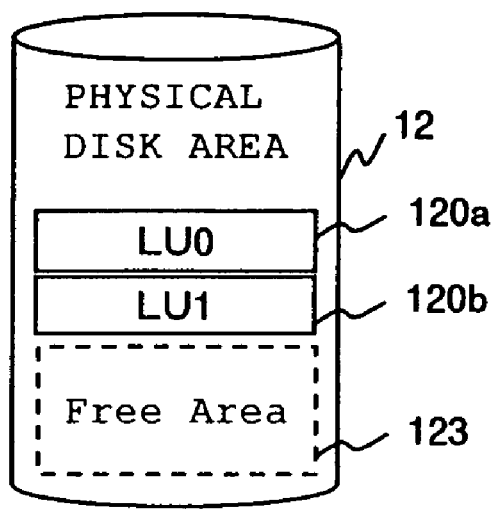
FIGS. 10A to 10C are diagrams each showing the state of inner LUs in a physical disk area corresponding to a construction change of the logical volume LU according to the second embodiment of the invention.

An LU construction change will now be concretely described. FIG. 10 is a diagram for explaining an example of the construction change of the embodiment. FIG. 10A shows a state of the inner LUs before a change. In a manner similar to the case of FIG. 4, a case of expanding the LU0 area of the computer 2a will be taken as an example. In the physical disk area 12, the LU0 area 120a and LU1 area 120b are continuously constructed, the LU0 area 120a is assigned to the computer 2a, and the LU1 area 120b is assigned to the computer 2b. In this example, it is assumed that the area other than those areas is a free area. In this example as well, although there is a sufficient free area, the LU1 area 120b is formed continuously after the LU0 area 120a, so that the LU0 area 120a cannot be physically expanded. In a manner similar to the first embodiment, the computer 2a sees the LU0 area 120a as its logical volume, and the computer 2b sees the LU1 area 120b as its logical volume.

Figure 10B:
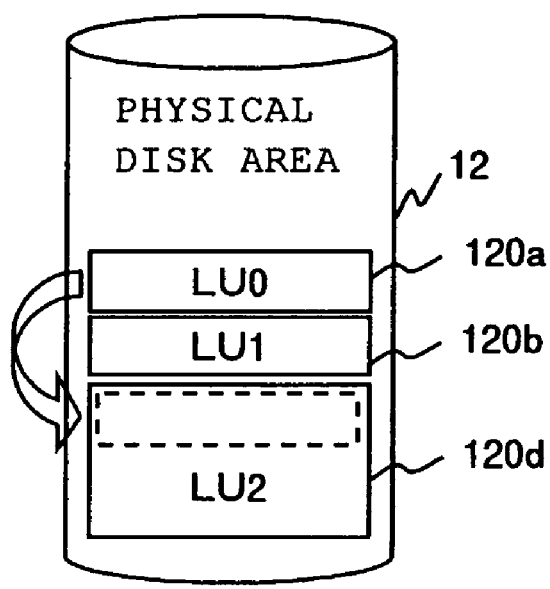
Figure 10C:
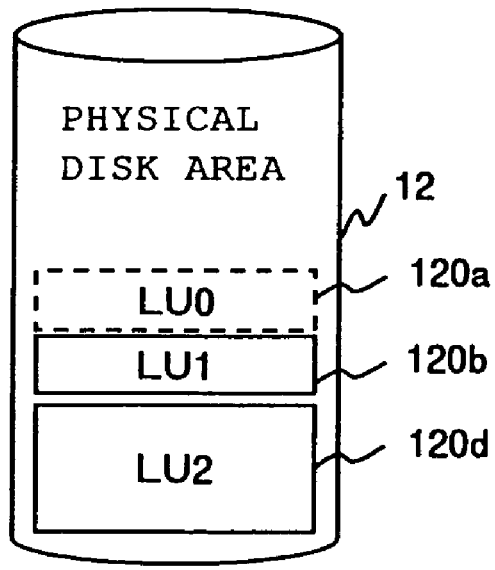

A copying operation related to expansion of an LU will be described first. When the operator of the management console 4 sends an indication for an LU construction change in which an inner LUN of the LU to be expanded and the expansion size are designated via the control utility 41 to the LU control means 11, the LU control means 11 assures an area of a new LU2 in a total size of the area size of the inner LUN of the LU to be expanded and the expansion area size in the free area 123. When the area cannot be assured, an error signal is sent to the control utility 41. The LU control means 11 instructs the copy means 13 to copy the data of the LU0 120a to the assured area LU2 120d from the top position of the area LU2 120d. FIG. 10B is a diagram for explaining a copying state by the copy means 13. As shown by a broken line in the area LU2 120d, the data is copied from the LU0 120a to the LU2 120d. After copying all the data of the LU0 120a to the LU2 120d, the copy means 13 notifies an end of the copy to the LU control means 11. FIG. 10C shows a state of the inner LUs after completion of the copying. The LU control means 11 which has received the copy end notification rewrites the LUN map 111 and assigns the LU2 120d to the computer 2a. The LU0 120a is not defined.

FIG. 11 shows an LUN map before updating, and FIG. 12 shows an updated LUN map. It is understood that, in the LUN map before updating, the computer 2a is assigned to the inner LUN 0. The computer 2a is assigned to the inner LUN 2 in the updated LUN map. Moreover, the number of blocks of the inner LUN 2 is larger than the initial number of blocks. It is therefore understood that the area enlargement has been realized by using a new area. By using the copy means as described above, a new inner LU is generated while holding the original data in the LU, so that the construction change such as LU expansion can be realized.

There is a case of accessing an LU from a computer during copying operation for the LU area change. In this case, when an access is a read access, it is sufficient to read data from the original LU area. If it is the write access, however, there is the possibility that a data discrepancy occurs unless data is written in both the original LU area of the corresponding address and a new LU area. When the target of the write access is the original LU area on which the copying operation has not been completed by the copy means 13, there is no problem. When the target of the write access is the original LU area on which the copying operation has already been finished, even if data of the address is updated, the new data is not read and copied to the new LU area. Consequently, if the copy end is notified in step 804, a data discrepancy occurs. When there is the possibility of occurrence of such a data discrepancy, the LU control means 11 writes data to areas of both the addresses during a period from step 802 to step 805. It is also possible to notify the address of the new area to the computer, and write the data to areas of both addresses by the computer.

As described above, by copying the data of the existing LU into a newly assured area, while utilizing the existing data, an LU area expansion or the like can be performed. Since one inner LU is assigned to one outer LU, the management is facilitated. According to the embodiment, the same effects as those of the first embodiment are obtained. Moreover, since the logical volume area is assigned to the physically continuously area, an effect such that the management of the logical volume is facilitated is produced.

Embodiment III

A third embodiment will be described. A computer system of the third embodiment is the same as that in the second embodiment. The third embodiment is realized by a combination of virtual combining of logical volumes in the first embodiment and expansion by the copying means in the second embodiment.

Figure 13:
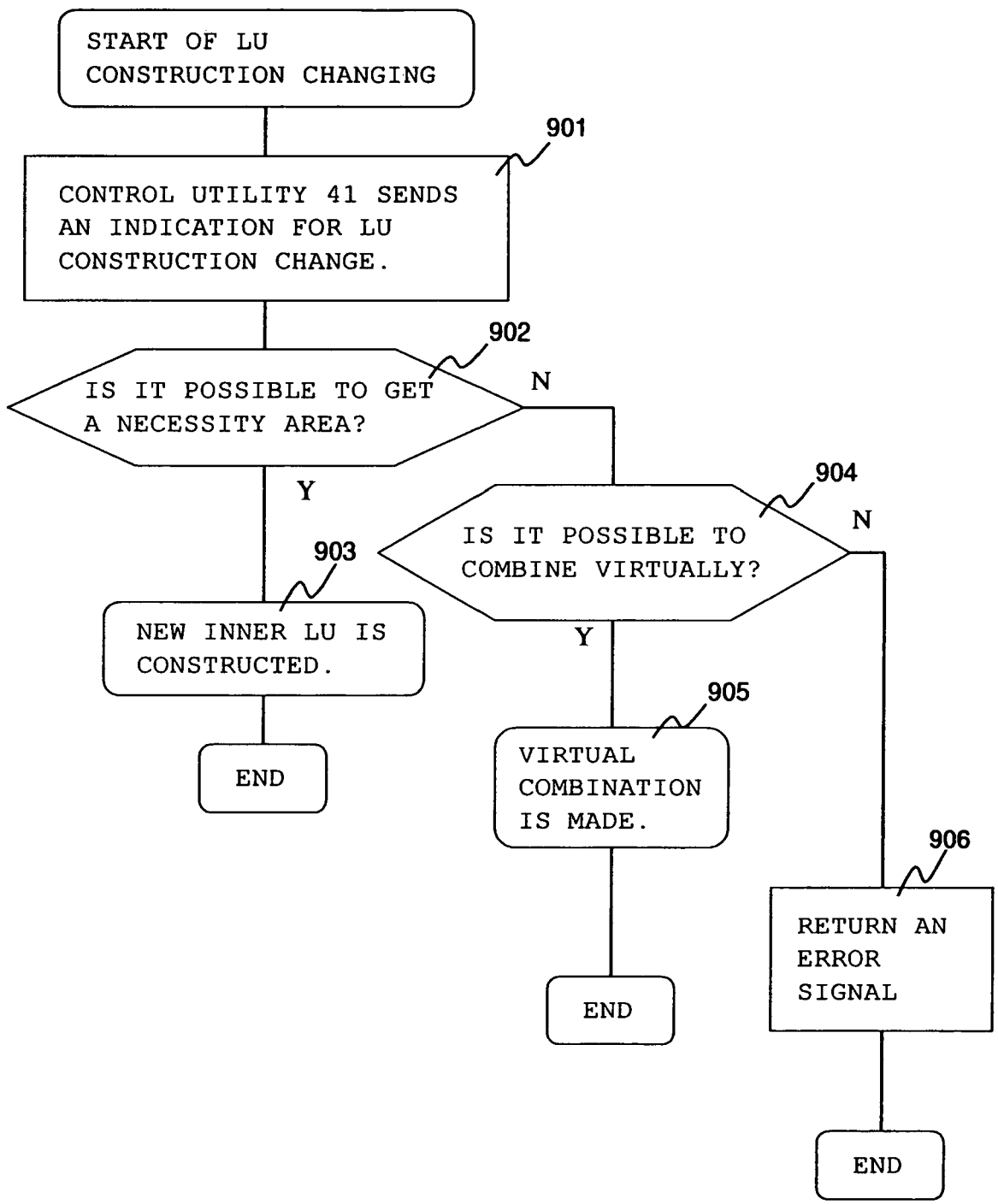
FIG. 13 shows a flowchart of a construction change in logical volumes LU of a third embodiment of the invention.

The LU construction change will be described by referring to the flowchart of FIG. 13.

The operator of the management console 4 sends an indication for LU construction change from the control utility 41. In the case of expanding the LU, all the inner LUNs assigned to the outer LU to be expanded and an expansion size are designated. The instruction is sent via the communication means 7 to the storage 1 (step 901).

The LU control means 11 in the storage 1 receives the instruction and determines whether the total size of the size of all the designated inner LUs and the expansion size can be assured in the free area or not (step 902).

If the area can be assured, all the designated LUs are copied by copy means and a new inner LU is generated. At this stage as well, a measure to avoid a data discrepancy described in the second embodiment is taken. The subsequent process is similar to that in the second embodiment (step 903).

When the area of the total size cannot be assured in the free area, the LU control means 11 determines whether virtual combination is possible or not. When the area of the expansion size can be assured, the virtual combination can be performed (step 904).

When the virtual combination can be performed, the assured area of the expansion size is virtually combined with the LU to be expanded (step 905). The following process is similar to that of the first embodiment.

If the virtual combination is impossible, the LU control means 11 returns an error signal to the control utility 41 and the routine is finished (step 906).

Figure 14A:
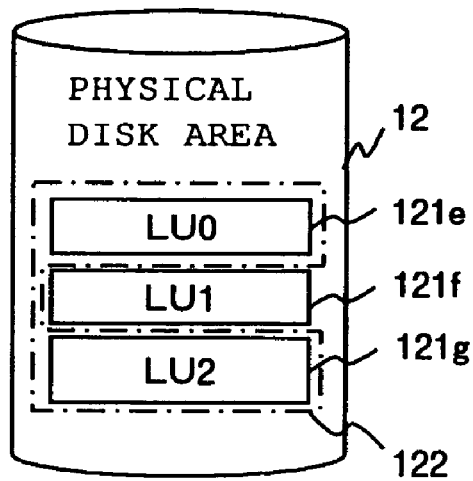
FIGS. 14A and 14B are diagrams each showing a state of an internal LU in a physical disk area corresponding to a construction change in the logical volume LU according to the third embodiment of the invention.
Figure 14B:
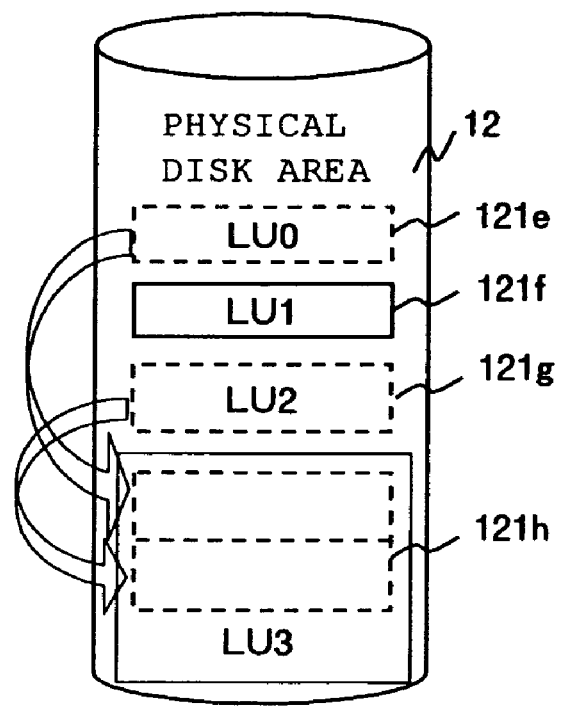
Figure 15:
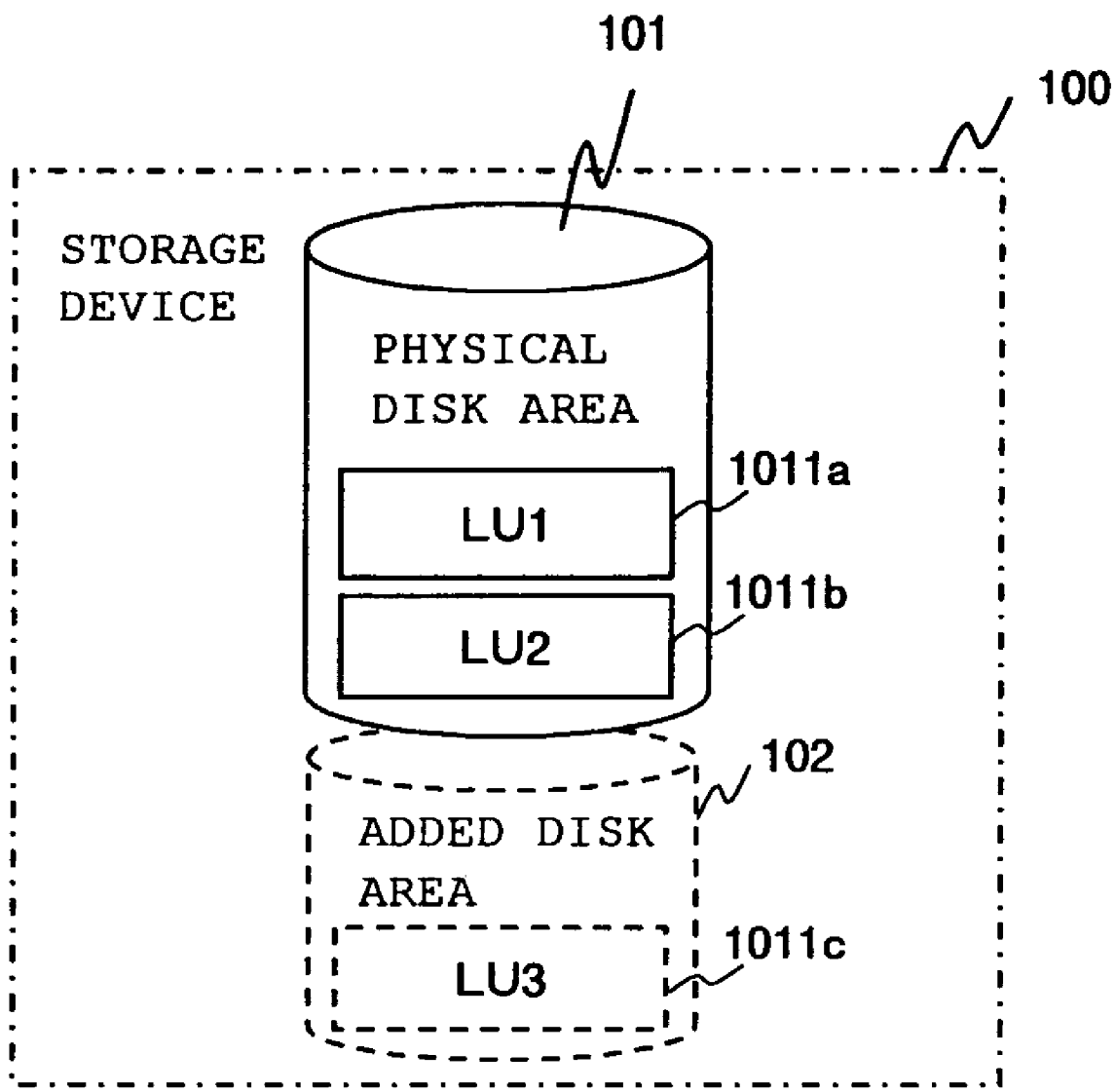
FIG. 15 is a diagram showing an example of the configuration of a storage according to a conventional technique.

An example of the result of the LU construction change according to the third embodiment will be described with reference to FIGS. 14A and 14B. Reference numeral 12 denotes a physical disk area, and reference numerals 121x (121e to 121h) indicate inner LUs. FIG. 14A shows a state where the logical volumes are virtually combined according to the first embodiment, thereby constructing the outer LU 122. In this state, the computer sees the outer LU 122 as a single LU. In the storage, however, it is known that the inner LU0 121e and the inner LU2 121g are separated from each other. FIG. 14B shows a state where a new inner LU3 121h having an area to be enlarged like the second embodiment is constructed. The data in the inner LU0 121e and the inner LU2 121g which are separated from each other is copied in a physically continuous area and combined as a signal inner LU. In any of the cases, the LUN map 111 is updated in correspondence with the case.

As described above, by combining the virtual combination of logical volumes in the first embodiment and expansion by the copy means in the second embodiment, a more flexible logical volume construction change can be realized. Particularly, since a plurality of separated LUs can be collected in a physically continuous area and integrated to a single LU, the management of the inner LUs can be facilitated.

As understood also from the description of the embodiments, the logical volume number map 111 of the invention does not have to have all the port number, target ID, outer LUN, LUN combining information, inner LUN, top LBA, the number of blocks, WWN, S_ID, and property as in the embodiments. For example, as understood from FIG. 6, since the top LBA can be calculated as a cumulative total of the numbers of blocks of inner LUs including the immediately preceding LU, it is sufficient to calculate the top LBA as necessary. In short, it is sufficient that the combination of the outer LUN seen from the computer and the inner LUN of the storage is clearly defined, and the computer to which the combination is used is known.

What is claimed is:

1. A storage system coupled to a plurality of computers, comprising:

a plurality of inner logical volumes; and a controller controlling the plurality of inner logical volumes and having an LUN map, wherein the LUN map provides an association among a first outer LUN, a first computer ID, and a plurality of first inner LUNs, wherein the first outer LUN designates an outer logical volume, wherein the first computer ID identifies a computer which can access the outer logical volume by using the first outer LUN, wherein the outer logical volume comprises a first plurality of the inner logical volumes, wherein each of the first inner LUNs designates one of the first inner logical volumes, whereby one first inner logical volumes is accessed when the outer logical volume is accessed from the computer, wherein the controller is configured to receive a configuration change instruction that designates the plurality of first inner LUNs, wherein if there is a second inner logical volume having a storage capacity satisfying the received configuration change instruction, then the controller copies data stored on each of the first inner logical volumes to the second inner logical volume and modifies the LUN map so that the first outer LUN and the first computer ID are associated with a second inner LUN that designates the second inner logical volume, wherein subsequent to the configuration change instruction, the second inner logical volume is accessed when the outer logical volume is accessed from the computer.

2. A storage system according to claim 1, wherein if there is a second inner logical volume having a storage capacity larger than a sum of a storage capacity of the first inner logical volumes, then the controller copies data stored on each of the first inner logical volumes to the second inner logical volume.

3. A storage system according to claim 1, wherein the first inner logical volumes are not contiguous areas of storage in the storage system.

4. A storage system coupled to a plurality of computers, comprising:

a plurality of inner logical volumes; and a controller controlling the plurality of inner logical volumes and having an LUN map, wherein the LUN map provides an association among a first outer LUN, a first computer ID, and a plurality of first inner LUNs, wherein the first outer LUN designates an outer logical volume, wherein the first computer ID identifies a computer which can access the outer logical volume by using the first outer LUN, wherein the outer logical volume comprises a first plurality of the inner logical volumes, wherein each of the first inner LUNs designates one of the first inner logical volumes, whereby one first inner logical volumes is accessed when the outer logical volume is accessed from the computer, wherein the controller is configured to receive a configuration change instruction that designates the plurality of first inner LUNs, wherein prior to said LUN map being modified, the first outer LUN and the first computer ID are associated with a first inner LUN, wherein subsequent to said LUN map being modified, the first outer LUN and the first computer ID are associated with a second inner LUN different from the first inner LUN, wherein the instruction to change a logical volume configuration includes information representative of the first inner LUN and of a requested size, wherein the controller is configured such that if a free storage area exists which has a size that is larger than the requested size plus the size of the inner logical volume designated by the first inner LUN, then the controller copies data stored in the inner logical volume designated by the first inner LUN to the free storage area and rewrites the LUN map to correlate the free storage area with the first outer LUN, with the first computer ID, and with the second inner LUN, the second inner LUN being associated with the free storage area.

* * * * *